United States Patent [19]

Gadeken et al.

[11] Patent Number: 4,825,071

[45] Date of Patent: Apr. 25, 1989

[54] GAMMA RAY BOREHOLE LOGGING METHOD AND APPARATUS HAVING COMPENSATION FOR BOREHOLE ATTENUATION EFFECTS

[75] Inventors: Larry L. Gadeken; Dan M. Arnold, both of Houston, Tex.

[73] Assignee: Halliburton Logging Services Inc., Houston, Tex.

[21] Appl. No.: 56,033

[22] Filed: May 27, 1987

Related U.S. Application Data

[63] Continuation of Ser. No. 720,450, Apr. 5, 1985.

[30] Foreign Application Priority Data

Mar. 20, 1986 [AU] Australia ............................ 86/54952
Mar. 20, 1986 [CA] Canada ................................ 5059351
Mar. 25, 1986 [EP] European Pat. Off. ........... 86302203

[51] Int. Cl.$^4$ ............................................. G01V 5/00
[52] U.S. Cl. .................................... 250/256; 250/262
[58] Field of Search ............................... 250/256, 262

[56] References Cited

U.S. PATENT DOCUMENTS

| 4,439,676 | 3/1984 | Smith, Jr. et al. | 250/256 |
| 4,492,863 | 6/1985 | Smith, Jr. | 250/256 |
| 4,527,058 | 7/1985 | Smith, Jr. | 250/256 |
| 4,542,292 | 9/1985 | Ellis | 250/256 |
| 4,568,829 | 2/1986 | Ruckebusch | 250/256 |

*Primary Examiner*—Carolyn E. Fields
*Assistant Examiner*—Richard Hanig
*Attorney, Agent, or Firm*—William J. Beard

[57] ABSTRACT

A method and apparatus (43) are disclosed for natural gamma ray spectral logging of a well borehole (41) to determine the abundances of uranium (U), potassium (K), and thorium (Th) gamma rays in the earth formations (46) adjacent to the borehole (41), and for compensating for borehole attenuation effects upon such gamma photons caused by scattering and absorption phenomena in the materials (42) within the borehole.

9 Claims, 5 Drawing Sheets

GAMMA RAY BOREHOLE LOGGING METHOD AND APPARATUS HAVING COMPENSATION FOR BOREHOLE ATTENUATION EFFECTS

This application is a continuation of copending application Ser. No. 720,450 filed Apr. 5, 1985, which copending parent application is hereby abandoned with the filing of this application.

BACKGROUND OF THE INVENTION

The present invention relates to methods and apparatus for logging earth formations penetrated by a well borehole, and more particularly to improved methods and apparatus for determining formation and borehole characteristics by the analysis of gamma rays entering the borehole from naturally occurring formation radiation. The invention thus has particular relevance to the determination of the absolute elemental abundances of potassium (K), uranium (U), and thorium (Th) in the earth formations adjacent the borehole.

Modern well logging tools typically contain gamma-ray sondes for detecting the photons emitted by naturally radioactive potassium, uranium and thorium elements. These elements are present to at least some degree in all earth formations. In recent years, gamma ray spectroscopy of earth formations to determine the weight concentrations of these three significant radioactive elements has been made practical by the development of highly stable scintillation detectors which may be lowered into a well borehole and which produce a pulse height spectrum proportional to the gamma ray energy spectrum of gamma rays impinging upon the scintillation crystal.

The number of gamma rays detected in a liquid filled borehole, however, is less than the number emitted into the borehole at the borehole wall, due to scattering and absorption phenomena in the borehole fluid and other intervening materials, such as casing, cement, and so forth. These attenuation effects can therefore result in erroneous measurements unless corrections are applied. Only in the case of an air-filled borehole is the attenuation negligible. Unfortunately, known means for applying corrections have been less than optimum, depending in many cases upon empirical compensation methods based upon comparisons with data from standard, known borehole conditions. Many boreholes, however, display parameters and conditions differing greatly from these standards. (There will be no error in the final log, of course, if the borehole conditions, such as diameter and mud weight, happen to match the standard conditions of the tool sensitivity calibration.)

A need therefore remains for a method and apparatus which can determine and compensate for such borehole attenuation effects upon the gamma radiations, which can accurately do so under widely varying borehole conditions, and which is versatile, uncomplicated, and readily suited to use in virtually all natural gamma ray spectral borehole logging applications.

SUMMARY OF THE INVENTION

Briefly, the present invention meets the above needs and purposes by providing methods and apparatus which utilize an analytic function that accurately gives the fraction of photons transmitted through the borehole fluid for arbitrary tool stand-off and borehole sizes, and for arbitrary conditions which are commonly encountered.

In one embodiment, the invention utilizes a borehole measurement system located within the borehole to detect the gamma radiations coming from the earth formations adjacent thereto. Count signals representative of the detected radiations are then generated. A determination is made of the overall attenuation effect upon the count signals which is caused by such factors as: (1) the extent to which the measurement within the borehole is an eccentered measurement, (2) multiple borehole materials, (3) the photoelectric effect, (4) Compton scattering, (5) potassium chloride mud, (6) barite mud, and (7) casing within the borehole. The count signals are then combined, and compensation is provided for this overall attenuation effect, thereby furnishing a measurement indicator which much more accurately represents the properties of the adjacent earth formations.

It is therefore a feature of the present invention to provide a new and improved borehole logging method and apparatus; such a method and apparatus which measure properties of earth formations adjacent the borehole as a function of radiations coming from the earth formations; which compensate for borehole attenuation effects upon such radiations; which detect, in the borehole, radiations coming from the earth formations adjacent thereto and generate count signals representative of the detected radiations; which determine the attenuation effect upon the count signals caused by the borehole materials; which combine these count signals and compensate for the attenuation effect according to a predetermined relationship to provide a measurement indicator representative of selected properties of the adjacent earth formations; and to accomplish the above features and purposes in an inexpensive, uncomplicated, durable, versatile, and reliable method and apparatus readily suited to the widest possible utilization in the measurement of earth formation properties adjacent to a borehole as a function of radiations coming from the earth formations.

Other features and advantages of the invention will be apparent from the following description, the accompanying drawings, and the appended claims.

DESCRIPTION OF THE PREFERRED EMBODIMENTS

Figure 1:
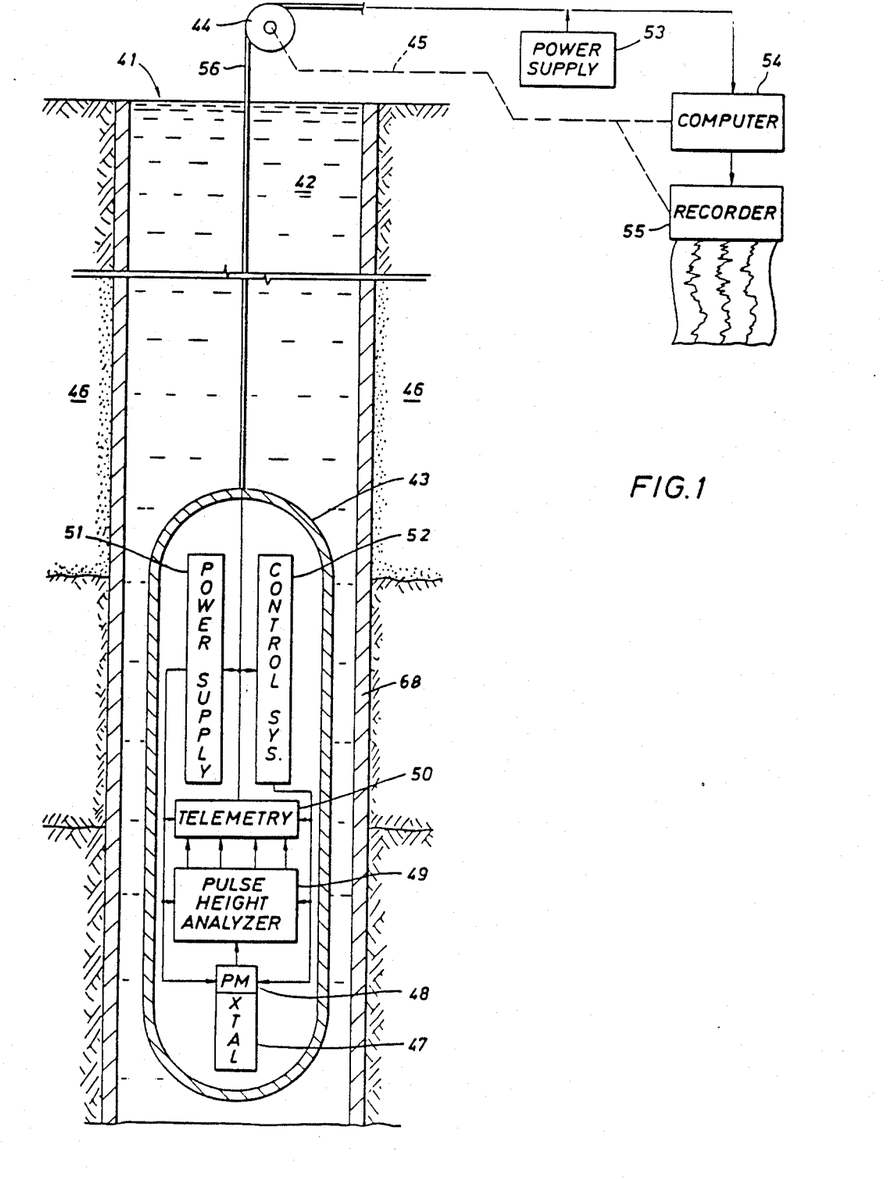
FIG. 1 is a schematic illustration of a well logging system employing the concepts of the present invention.

With reference to the drawings, the new and improved gamma ray borehole logging method and apparatus having compensation for borehole attenuation effects, according to the present invention, will now be described. Referring to FIG. 1, a well logging system in accordance with the concepts of the present invention is illustrated schematically. A well borehole 41 penetrates earth formations 46 and is lined with a steel casing 68. Typically, a cement annulus (not shown) will also be present between the casing 68 and the earth formations 46. The borehole 41 contains a well bore fluid 42 to control pressure in subsurface formations. It will be understood that the invention can also be used in open hole as well as cased hole.

Suspended in the borehole 41, by an armored well logging cable 56 of the conventional type, is a downhole measurement probe or sonde 43 containing instrumentation for measuring gamma ray spectral characteristics of the earth formations 46 penetrated by the borehole 41. Signals from the downhole sonde 43 are conducted to the surface on conductors of the cable 56 and supplied to a surface computer 54 which performs signal processing to extract the elemental constituents of potassium, uranium and thorium present in the earth formations 46. These are then recorded as a function of borehole depth on the recorder 55.

The well logging cable 56 passes over a sheave wheel 44 which is electrically or mechanically coupled (as indicated by a dotted line 45) to the computer 54 and recorder 55 in order to provide depth information about the downhole sonde 43 for the surface recording process.

In the preferred embodiment, the downhole sonde 43 contains, near the lower end thereof, a gamma ray detecting system comprising a scintillation crystal 47 and a photomultiplier and amplifier package 48. Power for the operation of the downhole sonde system is supplied from a surface power supply 53, via conductors of the cable 56, to a downhole power supply 51 where it is converted to appropriate voltage levels and supplied to the downhole circuitry components of the system as illustrated in FIG. 1. Gamma ray spectral signals are supplied from the photomultiplier tube 48 to a pulse height analyzer 49 where they are typically separated into count rates in four or more energy windows.

The pulse height analyzer provides the output signals corresponding to the count rates in each of the energy windows to a telemetry system 50 where the pulse height gamma ray spectral information is converted to an appropriate wave form for transmission to the surface via conductors of the well logging cable 56. Downhole control circuits 51 provide timing pulses to the pulse height analyzer and telemetry system in order to synchronize the transmission at regular data intervals from the downhole sonde 43 to the surface equipment. There synchronization signals are also encoded in the telemetry system 50 and supplied to the surface computer 54.

Thus, naturally occurring gamma rays from the earth formations 46 are detected by the scintillation crystal and photomultiplier detector system 47 and 48 in the downhole sonde 43, broken down into their energy constituents by the pulse height analyzer 49, and telemetered to the surface by the telemetry system 50 on conductors of the armored well logging cable 56. At the surface, the signals are processed in accordance with the teachings of the present invention to extract the radioactive elemental constituency of the earth formations 46 penetrated by the borehole 41.

The processing of the signals at the surface, in the preferred embodiment, is done using the method of weighted least squares (WLS) to calculate the K, U, and Th concentrations. It can be written in matrix form as:

(1) $C = AM$ and the corresponding WLS solution (T is transpose, −1 is inverse) is:

(2) $M = (A^T W A)^{-1} A^T W C$ where the elements of these matrices are defined as follows:

$C_i$ = count rate in window i (i = 1, ..., m)

$M_j$ = concentration of element j (j = K, U, Th)

$W_{ij}$ = weights ($W_{i \neq j} = 0$, $W_{i=j} = k/C_i$ where k is a constant depending on the logging speed)

$A_{ij}$ = count rate in window i per unit j (tool sensitivity for standard conditions)

Standard geometry is defined to be an eccentered tool in a fresh-water-filled, 9 inch diameter borehole.

For non-standard conditions the following relation holds:

(3) $A'_{ij} = A_{ij} F_{ij}(L)$ where the parameter L is proportional to the gamma ray attenuation cross section of the materials in the borehole. The functions, $F_{ij}$, are the factors by which the sensitivity matrix elements are changed to compensate for scattering and absorption effects in the borehole.

Figure 3:
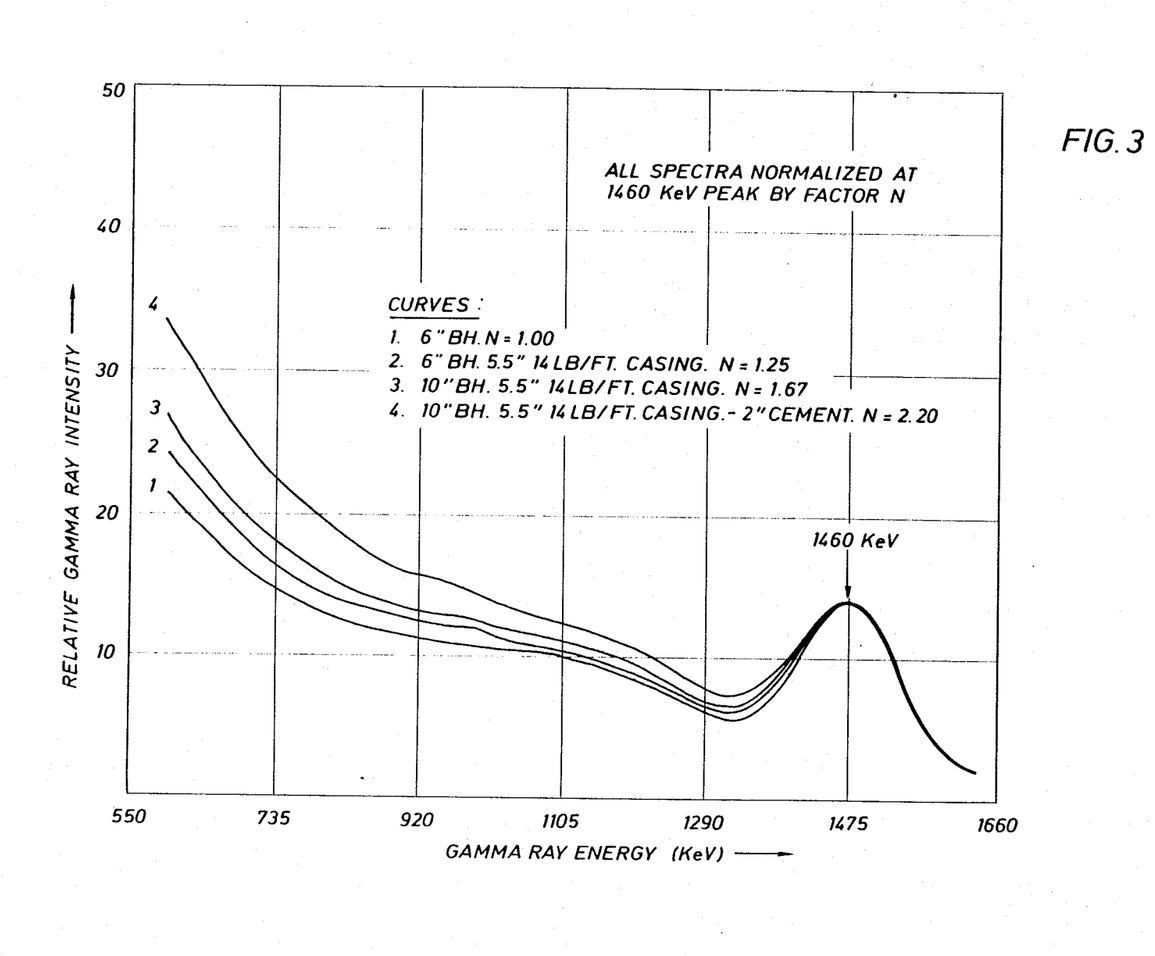
FIG. 3 is a graphical illustration of the changes in shape and intensity of high energy formation spectra due to borehole effects, again showing the need for borehole compensation.

When non-standard borehole conditions are encountered, the shape and intensity of the recorded gamma ray spectrum changes due to variations in the scattering and absorption properties of the borehole. This is illustrated in FIG. 3, which shows high energy spectra in potassium-rich laboratory formations with uncased, cased, as well as cemented and cased borehole conditions. From FIG. 3 it can be seen that the amount of downscattering, and hence the shape of each spectrum, is directly related to the quantity of material in the borehole. Observe that the actual shape of the curve changes, so that simple scale compensation (e.g., by taking relative ratios) will ordinarily not work. Also observe that the quantity of borehole material affects the count rate in the potassium peak itself, as indicated by the range of normalization factors in FIG. 3. These spectral variations induce changes in the sensitivity matrix A of equation (1). The sensitivity matrix must be adjusted for borehole conditions as K, U, and Th are being determined in order to obtain accurate elemental concentration measurements.

A further discussion of such a matrix borehole compensation method, and the substantial improvements which can be obtained thereby, may be found in: "A Multi-Function Compensated Spectral Natural Gamma Ray Logging System", by H. D. Smith, Jr., C. A. Robbins, D. M. Arnold, L. L. Gadeken, and J. G. Deaton (Society of Petroleum Engineers of AIME, Paper #12050, October 1983), and "Applications of the Compensated Spectral Natural Gamma Tool", by L. L. Gadeken, D. M. Arnold, and H. D. Smith, Jr. (SPWLA 25th Annual Symposium, Paper #JJJ, June 1984). The very important improvements described in these papers may be seen, for example, in FIGS. 9 and 10 of Paper #JJJ (above), which show that essentially the identical K, U, and Th results were measured both before and after the well was cased. These improvements resulted from adjusting the sensitivity matrix for borehole conditions, and clearly underscore the value and utility of accurate borehole compensation.

Figure 2:
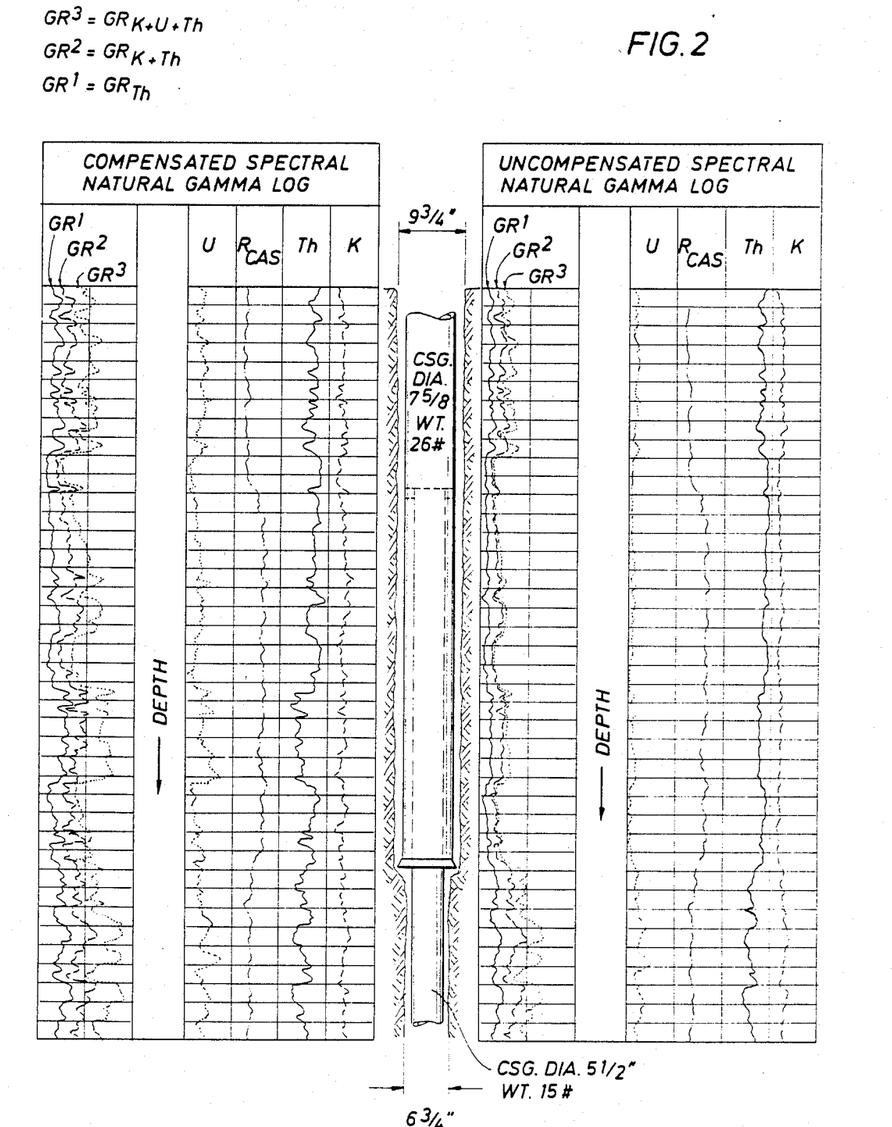
FIG. 2 shows a spectral natural gamma ray log of a borehole, in which the borehole geometry appears side-by-side between uncompensated and compensated logs thereof, thereby particularly illustrating the need for borehole compensation.

The present invention, which is related to the improvements described in the above papers, is directed to a method and apparatus for arriving at the functional form of the $F_{ij}$ term in equation 3). FIG. 2 of the present disclosure compares an uncompensated log with a log which has been compensated according to the teachings of the present invention, and illustrates the substantially improved results which such a compensated log provides. In order to understand the present invention, therefore, a model according to the invention, which is used to derive an analytical form for the functions, $F_{ij}$, will now be described.

It is well known that the functional form which describes gamma ray attenuation in good geometry (a narrow pencil of gamma photons passing through an absorbing slab located between source and detector) is proportional to $e^{-\Sigma t}$ where $\Sigma$ is the macroscopic cross section and t is the thickness of the absorbing material. In the energy region where Compton scattering is the principal interaction, the cross section is given by:

(4) $\Sigma_C = N(Z/A)\rho_B \sigma_C$ where N is Avogadro's number, Z the atomic number, A the atomic weight, $\rho_B$ the bulk density, and $\sigma_C$ the microscopic Compton cross section per electron. It is then convenient to define an "electronic" density:

(5) $\rho_e \approx 2(Z/A)\rho_B$

Then equation (4) is rewritten to emphasize the fact that the cross section is per electron:

(4') $\Sigma_C = g\rho_e, \; g = \frac{1}{2}N\sigma_C$

The borehole logging tool 43 typically detects gamma photons in an energy range from 20 keV to 3000 keV. It is important to remember that photoelectric effects of materials such as barite can affect the estimates of the K, U, and Th concentrations. We therefore now turn to consideration of gamma ray attenuation in the photoelectric energy region. The expression for the cross section is:

(6) $\Sigma_P = N(1/A)\rho_B \tau$ where the photoelectric cross section per atom is approximately:

(7) $\tau \approx 12.1 E^{-3.15} Z^{4.6}$ for typical sedimentary constituents.

It is convenient to define a normalized photoelectric cross section per electron:

(8) $P_e = (Z/10)^{3.6}$

Then equation (6) can be rewritten:

(6') $\Sigma_P = h P_e \rho_e, \; h = \frac{1}{2}N[12.1(10^{3.6})E^{3.15}]$

Since for natural gamma ray spectroscopy the pair production cross section can be neglected, the total gamma ray attenuation cross section is:

(9) $\Sigma = \Sigma_C + \Sigma_P$ or (cf. equations (4') and (6')):

(10) $\Sigma = g\rho_e + hP_e\rho_e$

Note that the factors, g and h, describe the microscopic gamma ray attenuation cross sections as well as energy dependent terms and other constants, while the factors, $\rho_e$ and $P_e$, are characteristics of the bulk material through which the gamma rays must pass. Recall that in good geometry situations when $\Sigma$ as defined in equation (10) may be used, the appropriate values for g and h may be calculated or extracted from published tables.

In fact, in a well bore the gamma ray emitting formation material completely surrounds detector 47 in logging sonde 43. In addition to the attenuation of gamma rays passing through the borehole fluid 42, there are multiple scattering effects as well. It is possible, using modern radiation transport computer codes which incorporate Monte Carlo or discrete ordinates algorithms, to calculate all relevant scattering and absorption effects in a borehole geometry. However, in so doing, the form of equation (10) is lost. In the context of the simple model which is the basis of this invention, the form of equation (10) is retained. That is to say:

(11) $\Sigma = \kappa\rho_e + \chi P_e\rho_e$ where $\kappa$ and $\chi$ are "effective" gamma ray cross sections which are determined from experimental data. A large number of measurements in a K-U-Th calibration facility with different borehole geometries (mud weights, casing diameters and weights, cement annuli, tool positions, and so forth) were interpreted on the basis of the analysis described below. The values of $\kappa$ and $\chi$ which were so obtained gave the excellent results described above.

Figure 4:
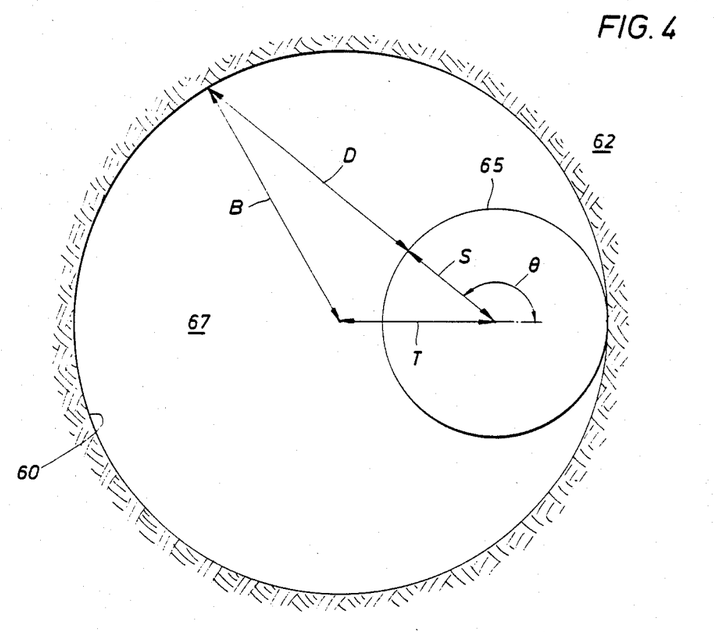
FIG. 4 is a schematic illustration showing the open hole geometry, in two dimensions, of a sonde which is eccentered in a borehole.

Referring now to FIG. 4, the method for the analysis of the borehole gamma ray attenuation, and the compensation therefor, according to the present invention, will now be explained. Assume that a cylindrical borehole 60 has penetrated a formation 62 which has a source of gamma photons uniformly distributed throughout. A cylindrical gamma-ray sonde 65 is placed in the borehole 60 and its contents 67 in order to measure the gamma ray flux. The problem is to determine the fraction of gamma rays emitted at the borehole wall which reach the sonde 65 after being attenuated by the borehole fluid 67. FIG. 4 shows the geometry in two dimensions.

The parameters are:
S-sonde radius
B-borehole radius
$\rho$-fluid density
T-offset from borehole center
D-distance through borehole fluid.

The attenuation at any angle $\theta$ is assumed to be given by:

(12) $A(\theta) = e^{-\kappa\rho D(\theta)}$ where $\kappa$ is an "effective" attenuation coefficient, as discussed above. More rigorously, it should be written as $\kappa_i$, since natural gamma ray spectral logging actually involves recording gamma ray events in several different energy windows. For each energy window, $W_i$, defined in the gamma ray spectrum, there will be a corresponding $\kappa_i$. Also, the expressions will generally include a $\chi$ term (i.e., $\kappa + \chi P_e$), as shown explicitly by equation (11). For the sake of brevity and simplified notation, however, we will usually refer to $\kappa$ only. $P_e$ terms and subscripts for $\kappa$ and $\chi$ will therefore be implicit in the following discussion.

The model represented by equation (12) states that the only effect of importance is the attenuation between the borehole wall and the sonde. All multiple scattering effects are ignored. This procedure is successful partly because $\kappa$ is not taken from tabulations of "narrow beam" attenuation coefficients, but is fit to experimental data or to Monte Carlo or discrete-ordinates transport calculations. Thus, the $\kappa$ parameter allows much of the true complexity of the problem to be hidden.

The total attenuation is given by integrating equation (12) over all angles:

$$(13) \quad A = \beta \int \pi_0^\pi e^{-\kappa \rho D(\theta)} d\theta$$

The parameter $\beta$ is a normalization constant which may be selected quite arbitrarily, and is usually chosen so that A is unity in the standard conditions. The distance parameter is:

$$(14) \quad D(\theta) = [B^2 - (T \sin \theta)^2]^{\frac{1}{2}} - T \cos \theta - S$$

The form of equation (14) is such that, except for centered geometry (discussed below), it is not possible to evaluate the integral of equation (13) in closed form. Instead, it must be evaluated numerically. Several good numerical integration algorithms for this functional form do exist and may be used to determine a set of $\kappa_i$ coefficients for a corresponding set of energy windows, $W_i$, by using least-squares techniques to fit a collection of experimental or computed data points in the range of interest.

When the sonde is centered the distance is independent of angle:

$$(15) \quad D_c = B - S$$

and the integral of equation (13) may be evaluated:

$$(16) \quad A_c = \beta e^{-\kappa \rho (B-S)}$$

Returning to the evaluation of count signals generated by an eccentered sonde, it is a substantial advantage to be able to perform real time evaluation, on the logging truck at the borehole 41, of the extent of the borehole attenuation. However, the computational power in the surface computers 54 which are usually used is presently too limited to be able to perform the necessary numerical integrations in the time available. To overcome this problem, equation (13) can be approximated by:

$$(17) \quad A \simeq \beta e^{-\kappa \rho (B-S)} \left[ \sum_{j=0}^{\infty} \left( \frac{T}{B} \right)^j \Psi_j(\kappa \rho B) I_j(K\rho T) \right]$$

Figure 6:
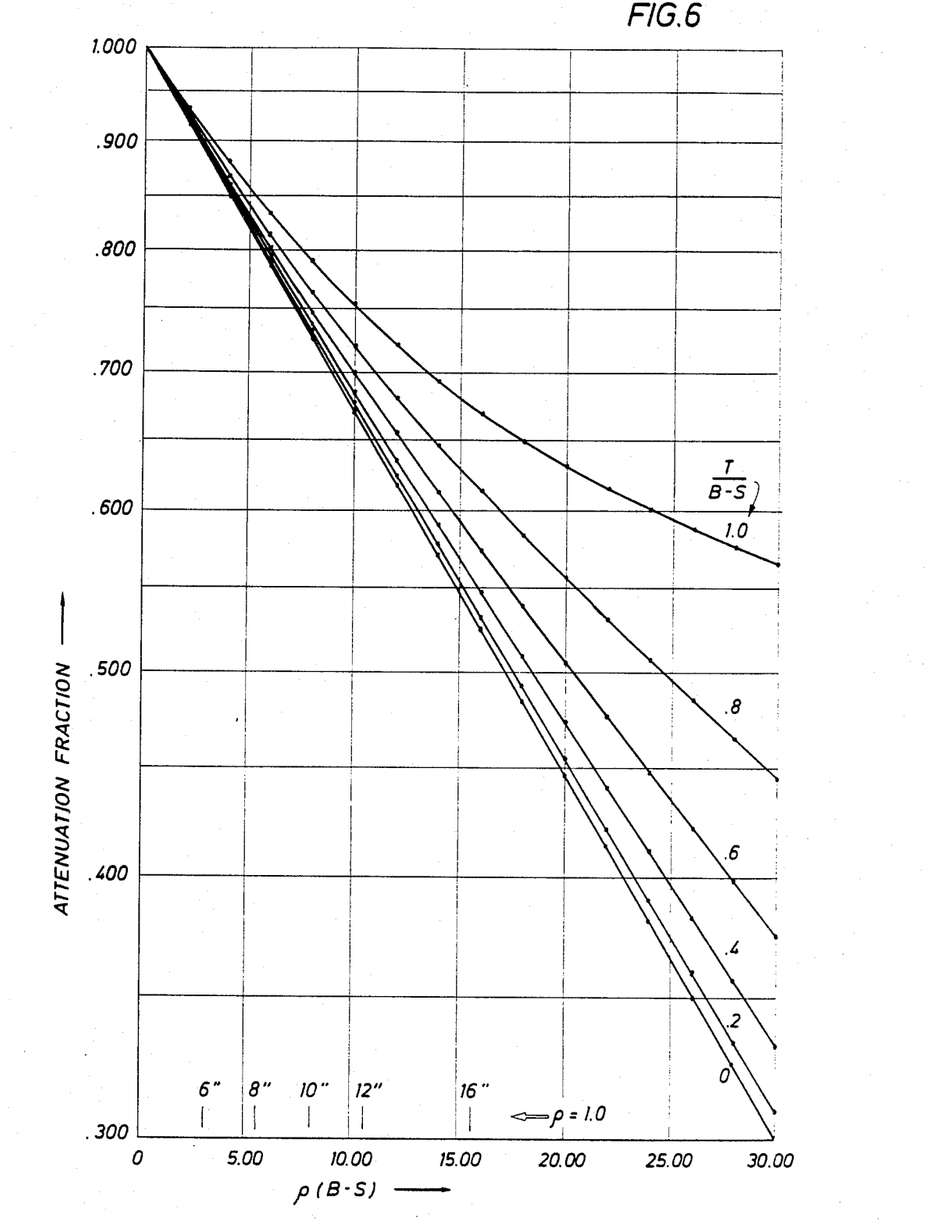
FIG. 6 is a graphical illustration showing a polynomial approximation for the parameter $\gamma$ used in an approximation solution which may be used in place of numerical solutions.

Each of the $\Psi_i$ is a power series, and the $I_j$ are the modified Bessel functions. Equation (17) may be further approximated by:

$$(18) \quad A \simeq \beta e^{-\kappa \rho (B-S)} [I_0(K\rho T) + \gamma(T/B) I_1(K\rho T)]$$

where $\gamma$ is a function to be determined which clearly depends on B and T. It has been found the $\gamma$ is almost linear as a function of the borehole size. FIG. 6 shows a polynomial approximation for which has a maximum error of about 0.3%. The small differences resulting from use of equation (13) or equation (18). Do not show up in FIG. 6. Real time calculations may be made by having tables of $I_0$ and $I_1$ for the appropriate range of arguments, so that the function values are found by performing table look-ups and interpolating.

Thus far the discussions and analysis have been specific to open hole geometry. It is important, of course, to generalize the analysis to account for conditions encountered in actual borehole conditions. Thus multiple borehole materials, the photoelectric effect, Compton scattering, potassium chloride mud, barite mud, and casing within the borehole must also be considered.

Figure 5:
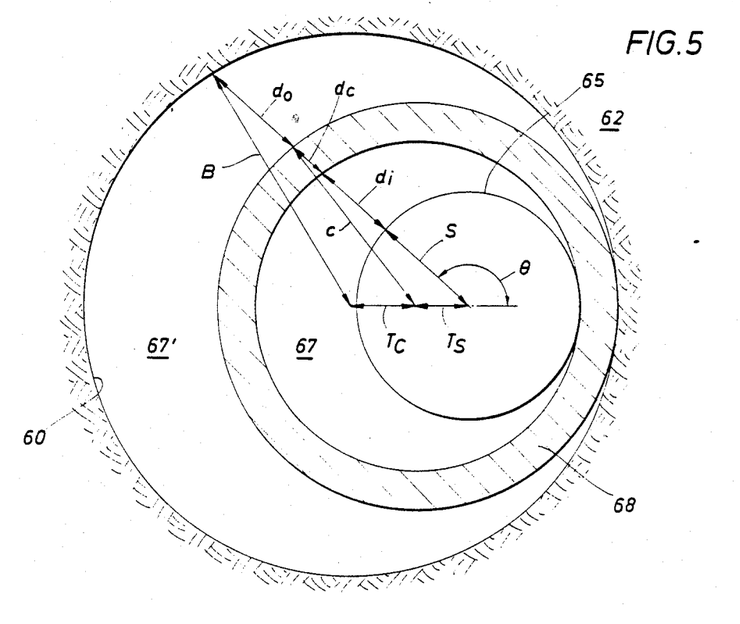
FIG. 5 is a schematic illustration similar to FIG. 4 showing the cased hole geometry, in two dimensions, of a sonde which is eccentered in a borehole.

In the analysis of multiple borehole materials, a typical cased hole geometry is shown in FIG. 5, the casing 68 separating the fluid 67 which is within the casing from the fluid 67' which is outside of it. The generalization of equation (13) is:

$$(19) \quad A = \frac{\beta}{\pi} \int_0^\pi e^{-\kappa \left[ \sum_n \rho_j d_j(\theta) \right]} d\theta$$

and that of equation (14) is:

$$(20) \quad d_j(\theta) = [b_j^2 - (t_j \sin \theta)^2]^{\frac{1}{2}} - t_j \cos \theta - S - \left( \sum_{j-1} d_{j-1} \right)$$

The notation $_n^{sum}$ indicates a sum over all (n) materials in the borehole, while $_{j-1}^{sum}$ means a sum up to $j-1$. The implementation of equation (19) is straight-forward, though slightly tedious. For completeness, the analog to equation (20) which is used in the lower energy regions where photoelectric effects become important (such as iron casing or barite muds) is given below:

$$(20') \quad A = \frac{\beta}{\pi} \int_0^\pi e^{-\left\{ \kappa \left[ \sum_n \rho_j d_j(\theta) \right] + \chi \left[ \sum_n P_j \rho_j d_j(\theta) \right] \right\}} d\theta$$

Experimental data from more than 500 measurements in a K-U-Th calibration facility with many different open and cased borehole configurations has shown that excellent results are obtained using this approximate model for gamma ray attenuation.

A non-negligible fraction of the wells drilled have potassium chloride added to the mud to help stabilize the formation. This perturbs the measurement of potassium in the formation due to its presence in the borehole fluid. In the two dimensional model described herein, the increase in the counting rates for the windows in the energy region to which the potassium contributes is given by the double integral:

$$(21) \quad W_{BH} = \frac{A_{BH} K_{BH}}{\pi} \int_0^\pi d\theta \int_S^{D+S} e^{-\kappa \rho (r-S)} r \, dr$$

where $A_{BH}$ represents the window counts per unit potassium in the mud and $K_{BH}$ represents the potassium weight concentration. This expression may be derived by referring to FIG. 4 and assuming that there is potassium in the mud. The value for D in the limit for the r integration is given by equation (14). The r integrand may be evaluated explicitly and gives the result:

$$W_{BH} = \frac{A_{BH}K_{BH}}{(\kappa\rho)^2} \quad (21')$$

$$\left\{ (1 + \kappa\rho S) - \frac{1}{\pi} \int_0^\pi [1 + \kappa\rho(D + S)] e^{-\kappa\rho D(\theta)} d\theta \right\}$$

This expression may be approximated by assuming that $\kappa\rho S \ll 1$ and $\kappa\rho D \ll 1$:

$$W_{BH} = \frac{A_{BH}K_{BH}}{(\kappa\rho)^2} \left[ 1 - \frac{1}{\pi} \int_0^\pi e^{-\kappa\rho D(\theta)} d\theta \right] \quad (21'')$$

As before, $A_{BH}$ and $\kappa$ are found from experimental data. Note that $\kappa$ from equation (21) and $\kappa$ from equation (13) are identical in the framework of this invention. Note also that although the discussion has been specific to KCl, the presence of any radioactivity in the borehole fluid can be accommodated by this analysis. Note further that the work of Ellis (Proc. 23rd Annual SPWLA Symposium, July, 1982, Paper 0), although not part of a general model of borehole attenuation, nevertheless shows that the form of equation (21'') gives sufficiently accurate corrections.

Let us reconsider how to approximate the integrals of equations (13), (19), and (20). In equation 16 set $L_c = \rho(B-S)$, so that we can write:

(16') $A_c = \beta e^{-\kappa L_c}$

This form separates the energy dependent "effective" attenuation coefficient $\kappa$ from the amount of material present in the borehole which we will parameterize by the quantity L. For any arbitrary borehole geometry, we write:

(22) $A = \beta e^{-\kappa L}$

Assuming that A is known by solving equation (19) numerically, then the value of L is given by:

$$L = -\frac{1}{\kappa} \ln\left(\frac{A}{\beta}\right) \quad (23)$$

The more complex problem of determining L for an arbitrary borehole geometry is then solved as follows. From equation (19) it is clear that for centered geometry with multiple annuli of different materials, equation (19) becomes:

$$A_c = \beta e^{-\kappa\left(\sum_n^{sum} L_j\right)} \quad (24)$$

where (25) $L_j = \rho_j d_j$ with $$d_j = b_j - S - \left(\sum_{j-1}^{sum} d_{j-1}\right) \quad (26)$$

The term $b_j$ is the outer radius of the $j$th absorbing material relative to the sonde, as can be seen by referring to FIG. 5.

It has been found empirically that for eccentered geometries the eccentered parameter $L_E$ can be obtained to sufficient accuracy from the centered parameter $L_c$ using a linear offset:

(27) $L_E = a + bL_c$ where a and b are determined empirically using the laboratory data. Equation (27) thus reflects an empirical polynomial, the linear expression of which is entirely adequate, as borne out by the excellent results produced on actual borehole logs.

The natural gamma ray spectrum gathered by a natural gamma ray spectral logging tool may cover the entire energy range from zero to 3000 KeV. It is clear that an L value may be selected for any arbitrary energy range. However, in order to minimize the number of parameters involved, it has been found reasonable to restrict the number of L's to two. These are $L_H$, in the high energy region where Compton scattering effects are dominant, and $L_L$, for a lower energy region in which Compton and photoelectric effects both contribute (in which case $L_L = P_e L_H$).

In a preferred embodiment, the energy ranges for the L's defined above were selected as follows:

$L_H$: 350-2950 KeV $L_L$: 135-350 KeV

Equation (20') gives the general expression for determining the attenuation for arbitrary borehole contents. Consider then the case for which the L values are fixed and the parameters necessary for their calculation are input before logging. In open hole situations where the borehole contents are relatively light, for example, light mud, or fresh or salt water, the photoelectric absorption in the boreholes is much smaller than that due to the formation, and $L_L$ equals $L_H$. In this case, only a single (Compton) L value will need to be determined which can be used to adjust the sensitivity matrix for all the windows. However, in cased hole and barite mud open hole situations, $L_L$ is not equal to $L_H$. Therefore, both $L_H$ and $L_L$ need to be estimated, and the high and low energy portions of the sensitivity matrix correspondingly adjusted. Therefore, if the compensation is to be performed correctly, it is necessary to determine $L_L$ accurately in cased hole and barite open hole situations. This proves to be possible because the casing and barite photoelectric absorption effects in the low energy region are explicitly included in $L_L$. In a preferred embodiment thirteen windows are then used for estimating the K, U, and Th concentrations, allowing a maximum amount of data to be optimally utilized and thus reducing statistical excursions on the log.

As may be seen therefore, the present invention has numerous advantages. It provides an uncomplicated and highly versatile method and apparatus which utilize a new and unobvious analytical function for specifying and compensating for the attenuation of gamma-rays in a borehole environment. It effectively separates the energy dependent attenuation factors from the factors which are a measure of the amount of material present in the borehole. The invention is readily suited to use in virtually all natural gamma ray spectral well borehole logging applications. In its general realization, it is equally appropriate and effective in compensating for borehole attenuation effects upon any radiations, whether natural or artificial, which enter the borehole from the adjacent earth formations. Radiations generated within the borehole, such as from radioactive materials in the drilling mud, can also be included and corrected. Compensation can be made for mud weighting materials regardless of type, e.g., barite, hematite, ilmenite, etc. The invention further provides methods and apparatus whereby these various compensations can be provided in real time, so that accurate compensations can be made contemporaneously while a well borehole is being logged.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A borehole logging method for measuring with a well logging tool in a well borehole radiations coming from adjacent earth formations and for compensating for borehole attenuation effects upon such radiations, comprising:

(a) detecting, in the borehole, gamma radiations emanating from the earth formations adjacent thereto over the energy range from 0 to 3 Mev, (b) generating count signals representative of the detected gamma radiations, (c) determining the attenuation effect upon the count signals caused by both the borehole materials and position of the well logging tool in the borehole by using parameters representative of said attenuation effect which are experimentally determined before the logging run and stored in a memory device to provide a set of predetermined attenuation parameters, and (d) combining said count signals and said stored attenuation parameters and compensating for the borehole attenuation effects on said count signals by utilizing said predetermined attenuation effect parameters according to a predetermined relationship comprising a predetermined polynominal approximation of a geometrical function related to the position of the logging tool in the well borehole to provide corrected count signals representative of the gamma radiations coming from the adjacent earth formations compensated for attenuation effects due to borehole materials and the geometry of the well logging tool in the borehole.

2. The method of claim 1 wherein said step of determinig the attenuation effect upon the count signals further comprises determining the portion of the attenuation effect caused by multiple borehole materials.

3. The method of claim 2 wherein said step of determining the attenuation effect upon the count signals further comprises determining the portion of the attenuation effect caused by the photoelectric effect.

4. The method of claim 3 wherein said step of determining the attenuation effect upon the count signals further comprises determining the portion of the attenuation effect caused by Compton scattering.

5. The method of claim 4 wherein said step of determining the attenuation effect upon the count signals further comprises determining the portion of the attenuation effect caused by potassium chloride mud.

6. The method of claim 5 wherein said step of determining the attenuation effect upon the count signals further comprises determining the efect upon the count signals caused by radioactive materials in the borehole.

7. The method of claim 6 wherein said step of determining the attenuation effect upon the count signals further comprises determining the attenuation effect caused by mud weighting materials.

8. The method of claim 7 wherein said step of determining the attenuation effect upon the count signals further comprises determining the attenuation effect caused by casing within the borehole.

9. The method of claim 8 wherein said step of determining the attenuation effect upon the count signals further comprises determining the attenuation effect caused by cement within the borehole.

* * * * *